United States Patent
Li et al.

(10) Patent No.: US 9,083,222 B2
(45) Date of Patent: Jul. 14, 2015

(54) SELF-EXCITED EDDY CURRENT LIQUID-COOLED RETARDER

(75) Inventors: Desheng Li, Beijing (CN); Lezhi Ye, Beijing (CN); Bingfeng Jiao, Beijing (CN); Xiao Du, Beijing (CN)

(73) Assignee: Beijing University of Technology, Beijing (CN)

( * ) Notice: Subject to any disclaimer, the term of this patent is extended or adjusted under 35 U.S.C. 154(b) by 169 days.

(21) Appl. No.: 13/469,877

(22) Filed: May 11, 2012

(65) Prior Publication Data

US 2013/0015026 A1 Jan. 17, 2013

(30) Foreign Application Priority Data

Jul. 12, 2011 (CN) .......................... 2011 1 0194741

(51) Int. Cl.
*H02K 49/00* (2006.01)
*H02K 11/00* (2006.01)
*H02K 49/04* (2006.01)
*H02K 1/20* (2006.01)
(Continued)

(52) U.S. Cl.
CPC .......... *H02K 11/0094* (2013.01); *B60L 3/0076* (2013.01); *B60L 7/14* (2013.01); *B60L 7/28* (2013.01); *B60L 11/14* (2013.01); *H02K 1/20* (2013.01); *H02K 9/19* (2013.01); *H02K 49/043* (2013.01); *B60L 2210/40* (2013.01); *B60L 2220/14* (2013.01); *B60L 2240/36* (2013.01); *Y02T 10/641* (2013.01); *Y02T 10/70* (2013.01); *Y02T 10/7077* (2013.01); *Y02T 10/7241* (2013.01)

(58) Field of Classification Search
CPC ......... H02K 49/043; H02K 1/20; H02K 9/19; H02K 11/0094; B60L 3/0076; B60L 7/14; B60L 7/28; B60L 11/14; B60L 2210/40; B60L 2220/14; B60L 2240/36; Y02T 10/7241; Y02T 10/70; Y02T 10/7077; Y02T 10/641
USPC .......... 188/267, 158, 161, 164, 264 R, 264 D, 188/266, 160; 310/105, 54, 107–110; 322/27, 44
See application file for complete search history.

(56) References Cited

U.S. PATENT DOCUMENTS 3,184,626 A * 5/1965 Luenberger ..................... 310/96
4,739,204 A * 4/1988 Kitamura et al. ........... 310/68 D
(Continued)

FOREIGN PATENT DOCUMENTS

CN 101425737 A * 5/2009

*Primary Examiner* — Thomas J Williams
*Assistant Examiner* — Mariano Sy
(74) *Attorney, Agent, or Firm* — Han IP Corporation

(57) ABSTRACT

A self-excited eddy current liquid-cooled retarder is disclosed. The retarder pertains to an auxiliary braking device retarding a vehicle, and comprises a retarder rotor, a retarder stator, a control module and a generator unit. The retarder rotor comprises a retarder coil, an electromagnet core and a core cage. The retarder coil is wound on a coil frame. The electromagnet core is inserted into the coil frame. The electromagnet core, the retarder coil and the coil frame are evenly distributed on the circumference of the core cage. The retarder rotor is connected to a transmission shaft of an automobile. The inner circle of the retarder stator and the outer circle of the electromagnet core of the retarder rotor are coaxial. The generator unit comprises a generator exciting winding, a generator exciting magnetic pole, a generator armature winding and a generator armature core and is received in the retarder rotor.

5 Claims, 1 Drawing Sheet

(51) Int. Cl.
*H02K 9/19* (2006.01)
*B60L 3/00* (2006.01)
*B60L 7/14* (2006.01)
*B60L 7/28* (2006.01)
*B60L 11/14* (2006.01)

(56) References Cited

U.S. PATENT DOCUMENTS

| | | | |
|---|---|---|---|
| 4,791,330 A * | 12/1988 | Charbonnier et al. | 310/105 |
| 4,864,173 A * | 9/1989 | Even | 310/93 |
| 5,064,029 A * | 11/1991 | Araki et al. | 188/267 |
| 5,743,599 A * | 4/1998 | Henderson et al. | 303/20 |
| 6,543,588 B1 * | 4/2003 | Raad | 188/267 |
| 7,176,597 B2 * | 2/2007 | Liu | 310/103 |
| 8,058,758 B2 * | 11/2011 | Ries | 310/90.5 |
| 2003/0057793 A1 * | 3/2003 | Yang | 310/191 |
| 2006/0226700 A1 * | 10/2006 | Liu | 303/152 |
| 2007/0295568 A1 * | 12/2007 | Vasilescu | 188/267 |
| 2008/0258693 A1 * | 10/2008 | Dessirier et al. | 322/29 |
| 2010/0244602 A1 * | 9/2010 | Perret et al. | 310/90 |
| 2013/0234542 A1 * | 9/2013 | Li et al. | 310/54 |

* cited by examiner

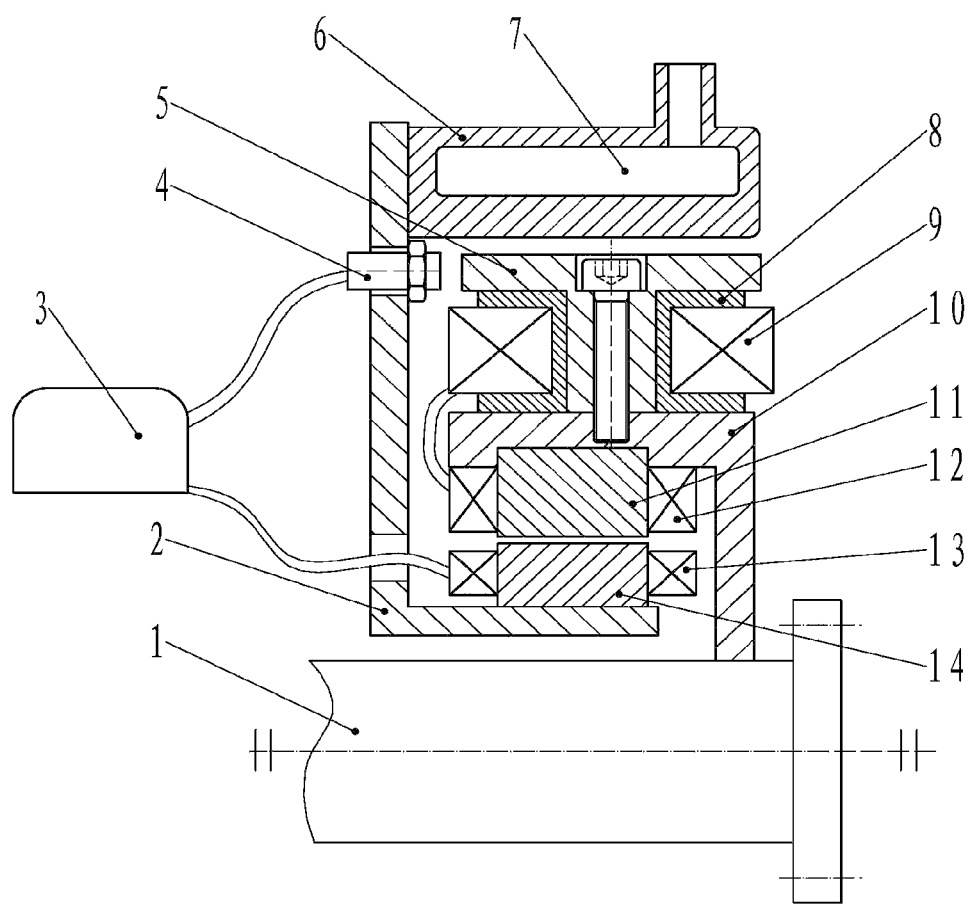

SELF-EXCITED EDDY CURRENT LIQUID-COOLED RETARDER

CROSS-REFERENCE TO RELATED APPLICATION

This application claims the priority benefit of Chinese Patent Application No. 201110194741.4, filed on Jul. 12, 2011. The entirety of the above-identified patent application is herein incorporated by reference and made a part of this specification.

TECHNICAL FIELD

The present disclosure relates to an automotive retarder. Particularly, the present disclosure relates to a self-excited eddy current liquid cooling retarder radiating heat by means of liquid cooling, and pertains to an auxiliary braking device retarding a vehicle.

BACKGROUND

A retarder is an auxiliary safety device for braking a vehicle. The retarder applies a braking force on the transmission component of the vehicle and plays a role in reducing the running speed of the vehicle. At present, the retarders most widely in use in China are eddy current retarders. Eddy current retarders convert the kinetic energy of running vehicles into thermal energy according to electromagnetic principle and radiate heat by means of air cooling. Eddy current retarders can improve the braking performance of automobiles, eliminate the noise and environmental pollution associated with conventional brakes, lengthen the service lifetime of brake pads and tires, and greatly improve the safety, comfort and economy of automobiles. Although an eddy current retarder has a number of advantages including a simple structure, low production and manufacturing cost, a short response time, intelligent control of braking torque and so on, it tends to have a large volume and weight, high power consumption, poor heat dissipation, and serious decay of braking torque during continuous operation. On the basis of the braking principle of an eddy current retarder, a self-generating system is added to a self-excited retarder and directly supplies power to the retarder so that there is no need to increase the capacity of the generator or battery of the automobile. It is light, energy efficient and environmentally friendly.

Existing self-excited retarders typically comprise a stator with exciting winding, a rotor with an air channel, and a generating system. The rotor is disposed on the automotive transmission system. The rotor coil is fixed on the chassis. The generating system typically comprises a three-phase synchronous generator and a rectifier circuit. When the generating system is started, the generator supplies power to the retarder, the stator coil is energized, magnetic lines of force pass the rotor, the self-excited retarder is in a braking state, and the kinetic energy of the automobile is converted into thermal energy and then dissipated to the atmosphere through the rotating rotor. When the generating system is shut down, no electric current passes through the stator coil, and the self-excited retarder is in a non-braking state. This structure has the advantage of power conservation, but the thermal decay of braking torque during continuous operation is still a serious issue.

The invention patent titled "Double-Rotor Self-Excited Retarder and Control Method Thereof" (Chinese Patent Application No. 201010516737.0) and the utility model patent titled "Automobile Retarder with Self-Generating Function" (Chinese Patent Application No. 201020205726.6) both disclose a self-excited retarder that is air cooled for heat dissipation, which cannot effectively dissipate the heat generated on the eddy current inductors of the retarders. This limits the increase of the braking torque of the self-excited retarders and the duration of continuous braking. The invention patent titled "A Self-Excited Retarder with A Cooling System" (Chinese Patent Application No. 200810243194.2) discloses a self-excited retarder, which dissipates heat by means of water cooling. Although the problem of water dissipation is addressed, this design requires a brush gear in order to transfer the power on the stator armature of the generator to the rotor coil of the rotating retarder. Consequently, the useful life is relatively short.

SUMMARY

An object of the present disclosure is to overcome the shortcomings of the foregoing prior art and provide a liquid cooled self-excited eddy current retarder with a brushless structure. The adoption of a brushless structure and heat dissipation by liquid cooling solves the problem of thermal decay of braking torque during continuous operation of a self-excited retarder. The retarder offers a number of advantages, including: a simple structure, easy intelligent adjustment, free maintenance and a long life.

According to one aspect, a retarder of the present disclosure comprises a retarder rotor, a retarder stator, a control module and a generator unit. The retarder rotor comprises a retarder coil, an electromagnet core and a core cage. The retarder coil is wound on a coil frame. The electromagnet core is inserted into the coil frame. The electromagnet core, the retarder coil and the coil frame are evenly distributed on the circumference of the core cage. The retarder rotor is connected to a transmission shaft. The inner circle of the retarder stator and the outer circle of the electromagnet core of the retarder rotor are coaxial. The generator unit comprises a generator exciting winding, a generator exciting magnetic pole, a generator armature winding and a generator armature core, and is received in the retarder rotor.

In one embodiment, the generator exciting winding and the generator exciting magnetic pole are connected to a stationary retarder mounting bracket. The generator armature winding and the generator armature core are connected to the rotating retarder rotor. The generator armature winding is connected to the retarder coil with wires or a rectifier module.

In one embodiment, the control module is connected to the generator exciting winding with wires and regulates the value of exciting current. The velocity sensor for measuring the running speed of the automobile is fixed on the retarder mounting bracket. Its induction section directly faces the rotating component of the retarder. Its signal output is connected to the control module.

In one embodiment, the inner circle of the retarder stator and the outer circle of the electromagnet core of the retarder rotor maintain a clearance of 0.5-1.5 mm.

In one embodiment, a water channel for cooling is disposed on the outer diameter of the retarder stator. The liquid in the water channel may be circulated with the cooling water of the engine, or with the independent cooling device of the retarder.

When the self-excited retarder provided by the present disclosure is in operation, it energizes the exciting winding of the generator unit through the control module, with induced electromotive force generated in the rotating armature winding. The electromotive force provides voltage for the retarder coil. Electric current is generated in the retarder coil. Consequently, magnetic lines of forces are generated in the retarder electromagnet core. The retarder stator cuts the magnetic lines of forces generated by the electromagnet core on the core cage. Eddy current is generated on the surface of the stator, and a torque that hinders the rotation of the rotor is generated. The braking torque acts upon the transmission shaft of the automobile through the core cage, thereby exerting a braking force on the automobile. Through adjustment of the current in the generator exciting winding by the control module, continuous adjustment of the braking torque of the retarder may be realized. The heat generated on the stator is carried away by the liquid inside the cooling channel. The liquid in the channel is circulated with the cooling water in the engine, or with the independent cooling device of the retarder. After heat dissipation, it flows back to the retarder and repeats the cycle.

When a permanent magnet retarder provided by the present disclosure is not in operation, the control module cuts off the current circuit in the generator exciting winding, the armature winding does not generate current, and no magnetic lines of force are generated in the retarder coil. Accordingly, the retarder stator is unable to cut the magnetic lines of force generated by the permanent magnet, no eddy current is generated in the retarder stator, and no braking torque acts upon the transmission shaft, thereby the braking of the automobile is released.

Compared with the prior art, the brushless self-excited eddy current retarder described in the present disclosure has numerous apparent advantages and beneficial effects as described below.

As the electromagnet core and the retarder coil provided by the present disclosure are used as a rotor and have no external rotating component, it is safer compared with conventional eddy current retarders. The generator armature core rotates together with the retarder coil and accordingly saves the need for a brush gear. It is highly reliable and maintenance free. The generator exciting winding is designed to be a stationary structure. Through velocity detection of the retarder and the adjustment of exciting current, it is easy to realize intelligent control of the braking torque of the retarder and cruise control. The stator is provided with a liquid-cooled device and features a desirable heat dissipation effect and small torque decay during long-term braking. The retarder has a compact overall structure and small volume and mass.

BRIEF DESCRIPTION OF THE DRAWINGS

FIG. 1 is a structural diagram of a self-excited eddy current-liquid cooled retarder in accordance with the present disclosure.

In FIG. 1, various components are labeled as follows: 1—transmission shaft of an automobile, 2—retarder mounting bracket, 3—control module, 4—velocity sensor, 5—electromagnet core, 6—retarder stator water jacket, 7—liquid channel, 8—coil frame, 9—retarder coil, 10—core cage, 11—generator armature core, 12—generator armature winding, 13—generator exciting winding, 14—generator exciting magnetic pole.

DETAILED DESCRIPTION OF SAMPLE EMBODIMENTS

A specific embodiment of the present invention will now be described below by referring to the accompanying drawing.

As shown in FIG. 1, in one embodiment, a liquid channel 7 is defined in the retarder stator 6 and disposed on the outermost side of the retarder. The retarder stator 6 and the velocity sensor 4 are both fixed on the retarder mounting bracket 2. The velocity sensor 4 is used to measure the rotational speed of the retarder. The retarder coil 9 and the coil frame 8 are fixed inside the electromagnet core 5. In one embodiment, electromagnet cores 5, in a quantity in the range of 8-12, are evenly distributed on the outer circumference of the core cage 10. In one embodiment, the outer diameter of the electromagnet core 5 and the inner diameter of the stator water jacket 6 maintain a clearance of approximately 0.5-1.5 mm. The core cage 10 is fixed on the transmission shaft 1 and rotates together with the transmission shaft 1. The generator armature core 11 is embedded in the inner ring of the core cage 10 and affixed to the core cage 10. In one embodiment, the generator armature winding 12 comprises distributed three-phase AC generator winding. In one embodiment, the generator exciting magnetic pole 14 is connected to the retarder mounting bracket 2. In one embodiment, the generator exciting winding 14 comprises concentrated winding and is connected to a 24V onboard battery with wires. The velocity sensor 4 is connected to the control module 3 and provides signals about the rotating speed of the retarder for the control module 3. The control module 3 is connected to the generator exciting magnetic pole 14 and controls the amount of the current in the generator exciting magnetic pole 14.

When the retarder is in operation, the control module makes the 24V power supply and the generator exciting winding 13 connected, current is generated in the generator exciting winding 13, magnetic lines of force are generated in the generator exciting magnetic pole 14, and the conductor in the rotating generator armature winding 12 cuts the magnetic lines of force to generate three-phase AC electromotive force. The electromotive force converts three-phase alternating current into direct current through wires or a three-phase AC rectifier. The direct current is transmitted to the retarder coil 9 to excite the retarder coil 9, so the retarder electromagnet core 5 generates magnetic lines of force. The stator water jacket 6 cuts the magnetic lines of force generated by the electromagnet core 5 and generates eddy current, in the stator water jacket 6, and torque that hinders the rotation of the electromagnet core 5. The braking torque acts upon the transmission shaft 1 through the core cage 10, thereby exerting a braking force on the automobile. The heat generated on the inner surface of the liquid channel 7 during braking is carried away by the liquid in the liquid channel 7. After the cooling liquid is cooled by the radiator of the engine water tank of the automobile, it flows back to the retarder and repeats the cycle.

Through the retarder shift controller or the signal from the velocity sensor 4, the control module 3 adjusts the current in the generator exciting winding 13. Consequently, the electromotive force in the generator armature winding 12 is changed, so is the exciting current in the retarder coil 9. Thereby, continuous adjustment to the braking torque of the retarder, regulation in steps, and cruise control can be realized.

When braking is not needed, the control module 3 cuts off the current in the generator exciting winding 13. No electromotive force is generated in the generator armature winding 12, there is no excitation in the retarder coil 9, no magnetic lines of force is generated in the electromagnet core 5, and no braking torque acts on the transmission shaft 1. Thereby, the braking of the automobile is released.

Compared with conventional eddy current retarders, a retarder in accordance with the present disclosure is safer, more reliable, energy efficient, and maintenance free. The disclosed retarder may easily realize intelligent control of the braking torque of the retarder and cruise control. The overall structure of the disclosed retarder is compact, and its volume and mass are relatively smaller compared to those of conventional eddy current retarders.

What is claimed is:

1. A self-excited eddy current liquid-cooled retarder, comprising:
   a retarder rotor, comprising:
   a core cage coupled to a transmission shaft,
   a coil frame,
   a retarder coil wound on the coil frame, and
   an electromagnetic core inserted in the coil frame,
   wherein the electromagnetic core, the retarder coil, and the coil frame are evenly distributed on a circumference of the core cage;
   a retarder stator, an inner circumference of the retarder stator and an outer circumference of the electromagnetic core of the retarder rotor being coaxial;
   a stationary retarder mounting bracket, wherein the retarder stator is connected to the retarder mounting bracket;
   a velocity sensor disposed on the stationary retarder mounting bracket, the velocity sensor configured to measure a rotational speed of the retarder to provide an output signal in response to the measuring;
   a control module coupled to receive the output signal from the velocity sensor;
   a battery; and
   a generator unit, the generator unit disposed between the core cage and the stationary retarder mounting bracket, the generator unit comprising:
   a generator exciting winding connected to the stationary retarder mounting bracket, the generator exciting winding coupled to receive an exciting current from the battery,
   a generator exciting magnetic pole connected to the stationary retarder mounting bracket,
   a generator armature winding, and
   a generator armature core,
   wherein the generator armature core rotates together with the retarder coil such that the retarder is a brushless retarder and the generator exciting winding does not rotate,
   wherein the control module is connected to the generator exciting winding and configured to regulate, based on the output signal from the velocity sensor, an amount of the exciting current in the generator exciting winding to continuously adjust a braking torque of the retarder and such that the control module cuts off the exciting current in the generator exciting winding when braking is not needed, and
   wherein the control module adjusts, based on the output signal from the velocity sensor, the exciting current in the generator exciting winding to adjust an electromotive force in the generator armature winding and an electric current in the retarder coil.

2. The retarder as recited in claim 1, wherein the generator armature winding and the generator armature core are connected to the retarder rotor.

3. The retarder as recited in claim 1, wherein the generator armature winding is connected to the retarder coil with wires or a rectifier module.

4. The retarder as recited in claim 1, wherein the inner circumference of the retarder stator and the outer circumference of the electromagnet core of the retarder rotor maintain a clearance of approximately 0.5-1.5 mm.

5. The retarder as recited in claim 1, wherein a liquid channel for cooling is disposed on an outer diameter of the retarder stator.

* * * * *